(12) United States Patent
Wernersson

(10) Patent No.: US 7,646,974 B2
(45) Date of Patent: Jan. 12, 2010

(54) COLOR ADJUSTMENT FOR CAMERA

(75) Inventor: Mats Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 251 days.

(21) Appl. No.: 11/534,487

(22) Filed: Sep. 22, 2006

(65) Prior Publication Data

US 2008/0075447 A1 Mar. 27, 2008

(51) Int. Cl.
*G03B 15/03* (2006.01)
*G03B 7/00* (2006.01)
*H04N 5/222* (2006.01)

(52) U.S. Cl. ................ 396/164; 396/225; 396/176; 348/224.1; 348/371

(58) Field of Classification Search ............. 396/155, 396/157, 176–178, 164, 225; 348/223.1, 348/224.1, 227.1, 236, 370, 371; 316/241 P, 316/241 S See application file for complete search history.

(56) References Cited

U.S. PATENT DOCUMENTS

| 5,815,204 | A | 9/1998 | Abe et al. |
| 6,081,076 | A | 6/2000 | Ogawa |
| 2003/0095406 | A1 | 5/2003 | Lebens et al. |
| 2005/0134723 | A1 | 6/2005 | Lee et al. |
| 2008/0218610 | A1* | 9/2008 | Chapman et al. ............ 348/246 |

OTHER PUBLICATIONS

International Search Report and Written Opinion for PCT/IB2007/050925, mailed Aug. 20, 2007, (13 pages).
International Preliminary Report on Patentability for PCT/IB2007/050925, mailed Dec. 17, 2008, (6 pages).

* cited by examiner

*Primary Examiner*—Rochelle-Ann J Blackman
(74) *Attorney, Agent, or Firm*—Harrity & Harrity, LLP

(57) ABSTRACT

A device may include a camera to capture an image, a sensor to measure information indicative of a color characteristic of light in an environment, and a processor to adjust a color characteristic of a flash based on the color characteristic of the light in the environment and activate the flash for capturing the image according to the adjusted color characteristic.

19 Claims, 16 Drawing Sheets

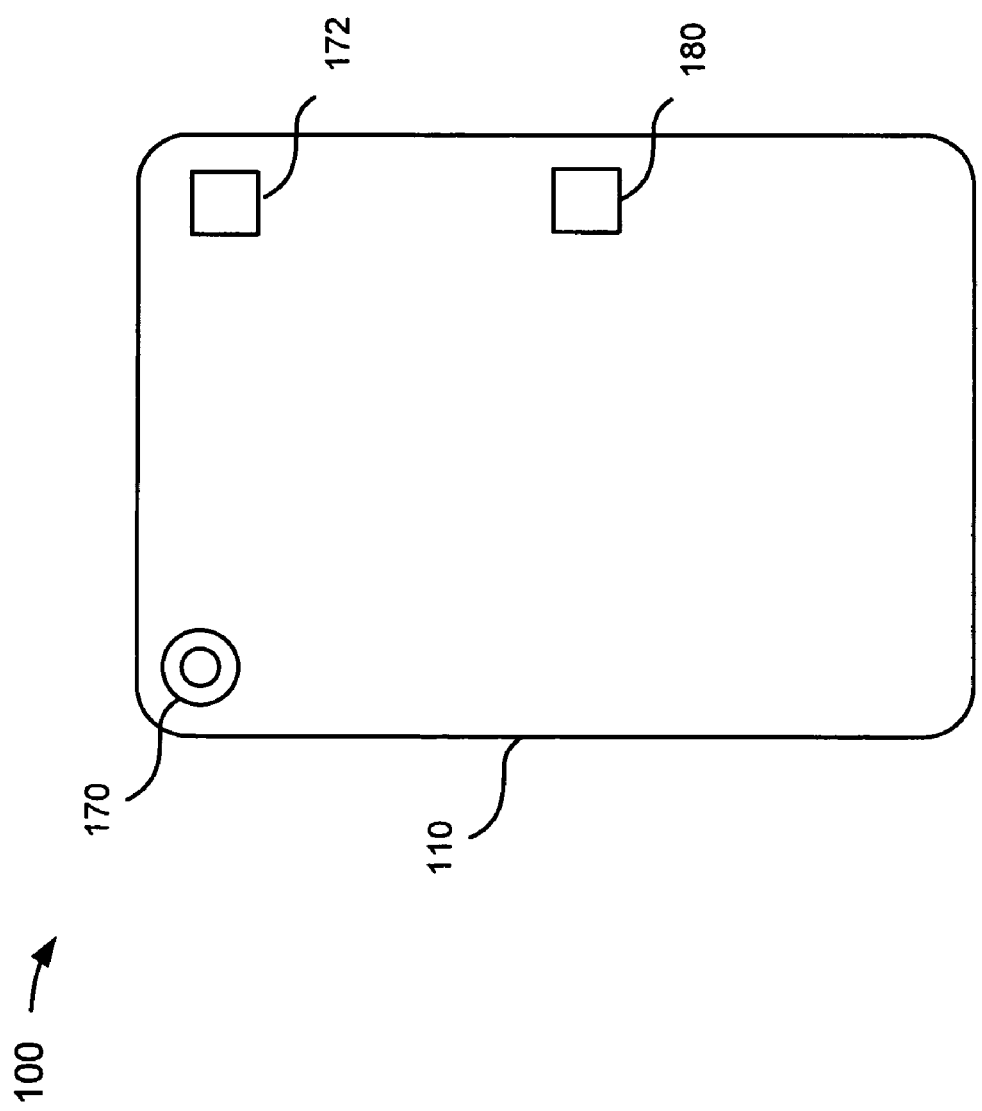

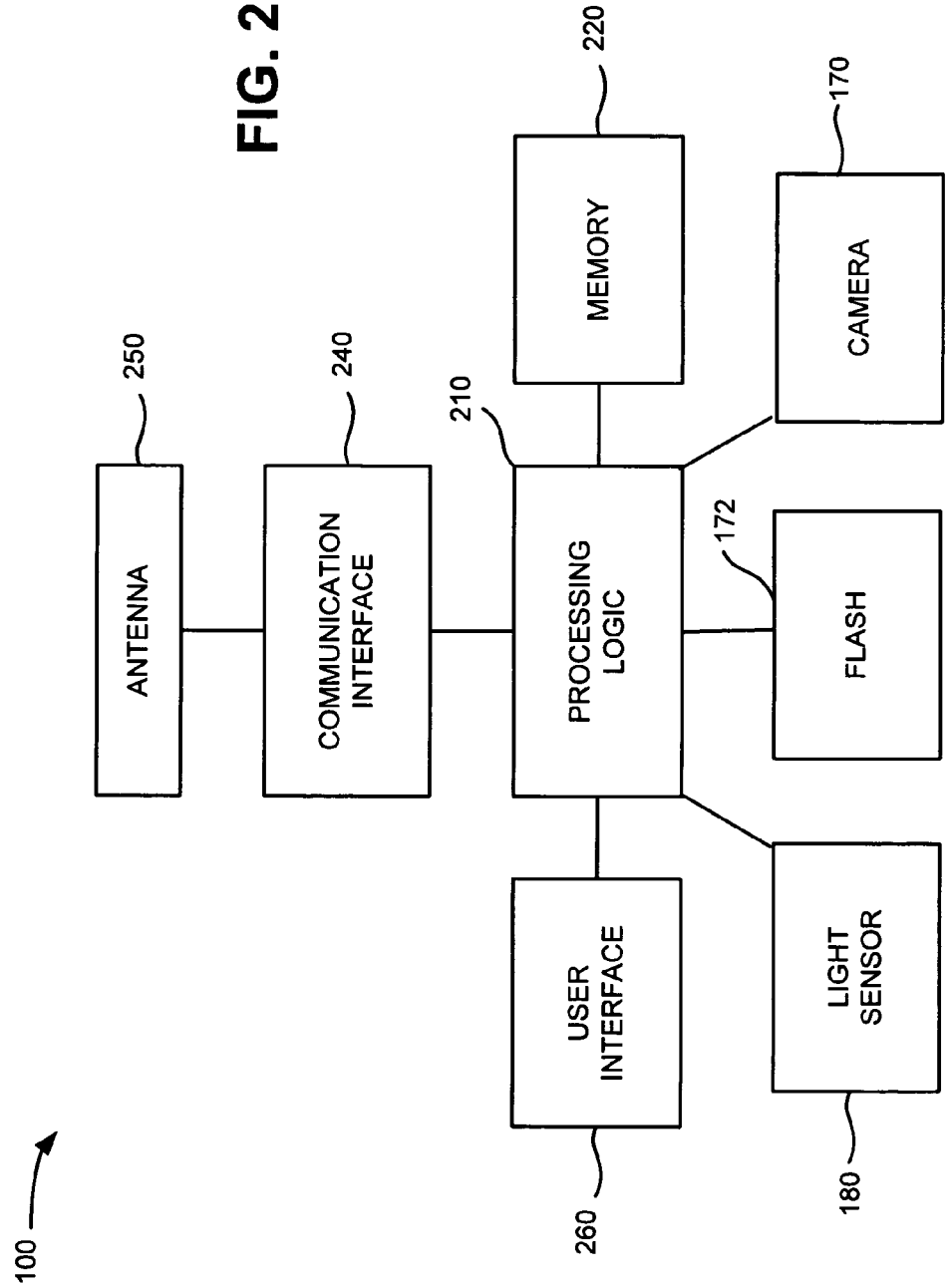

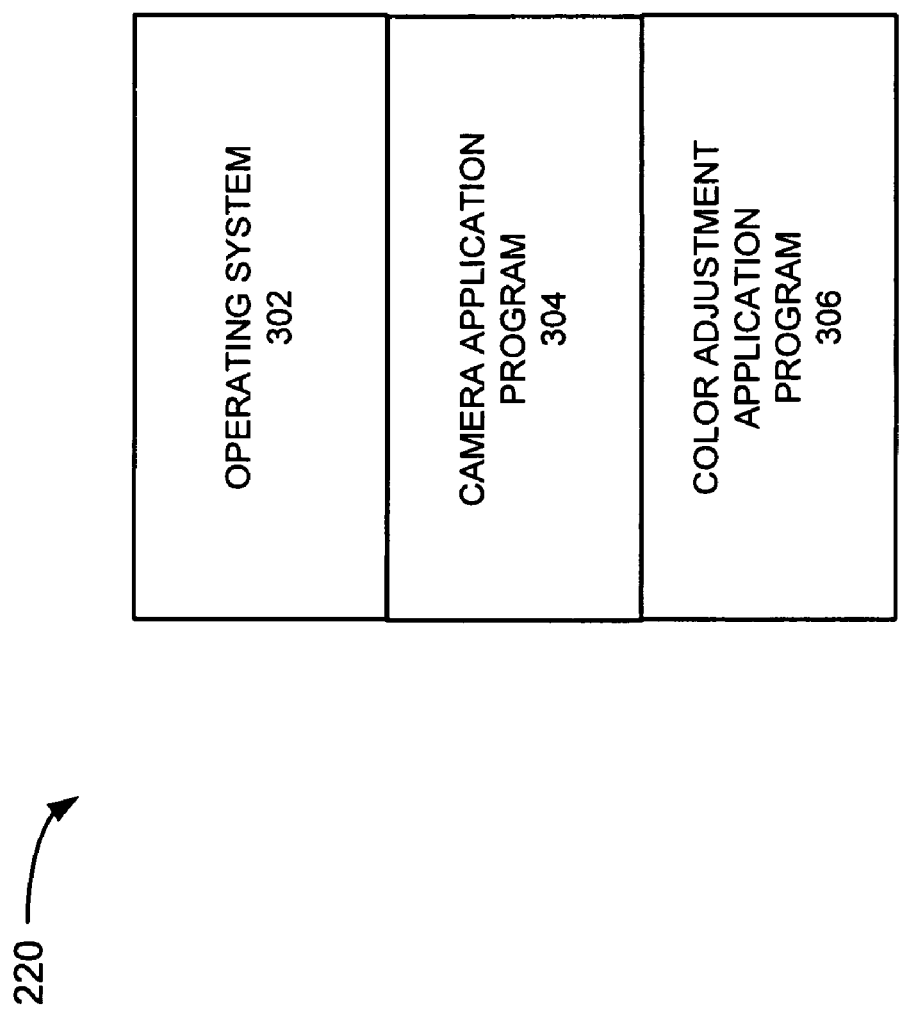

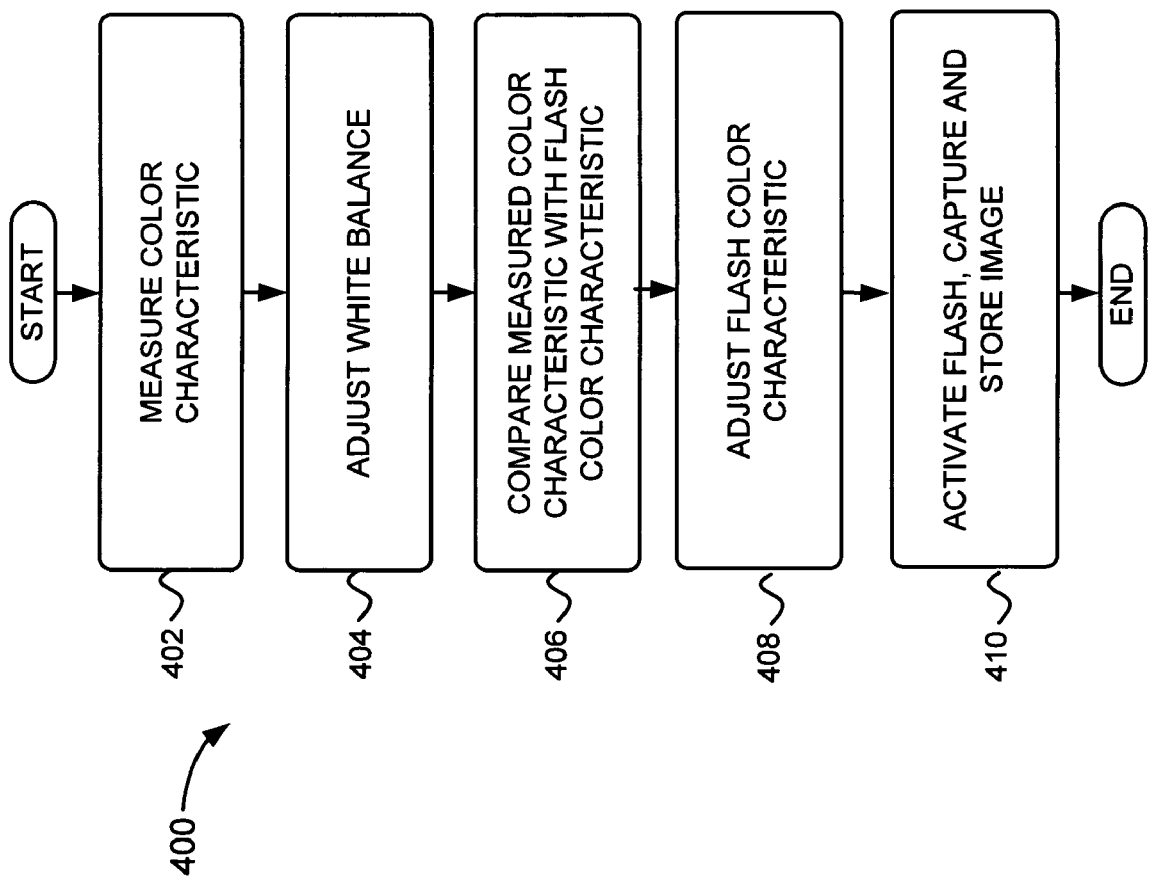

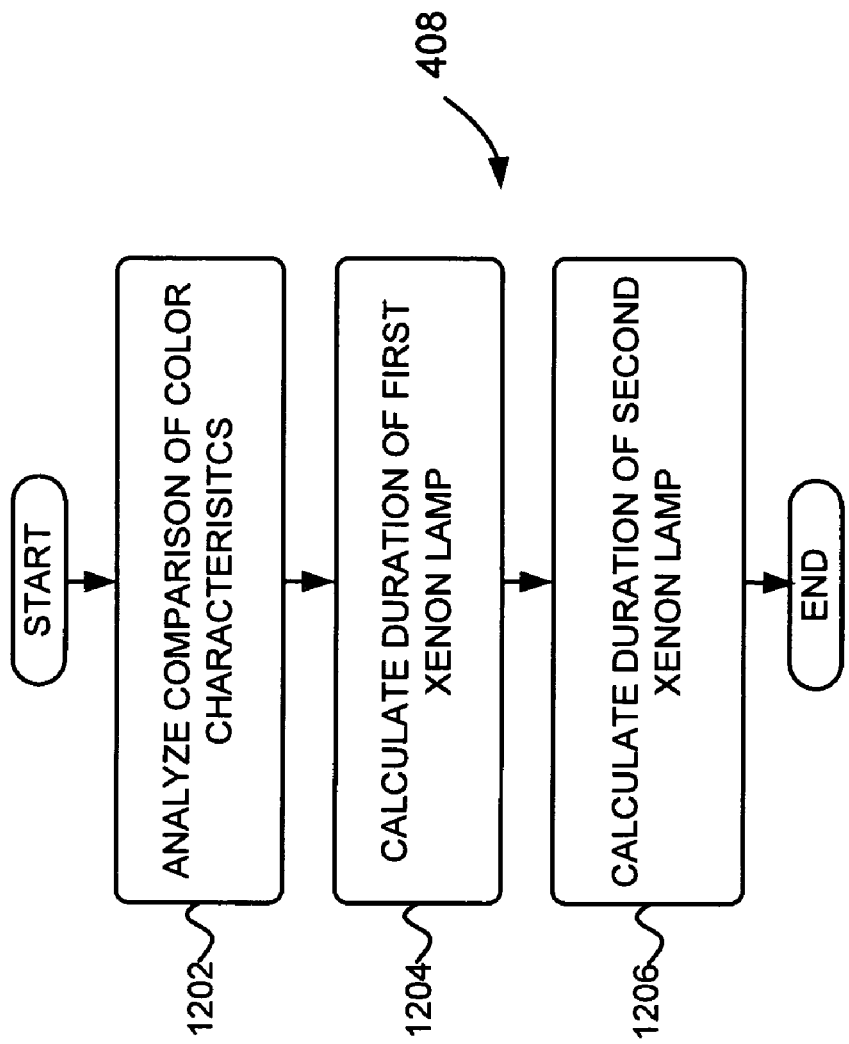

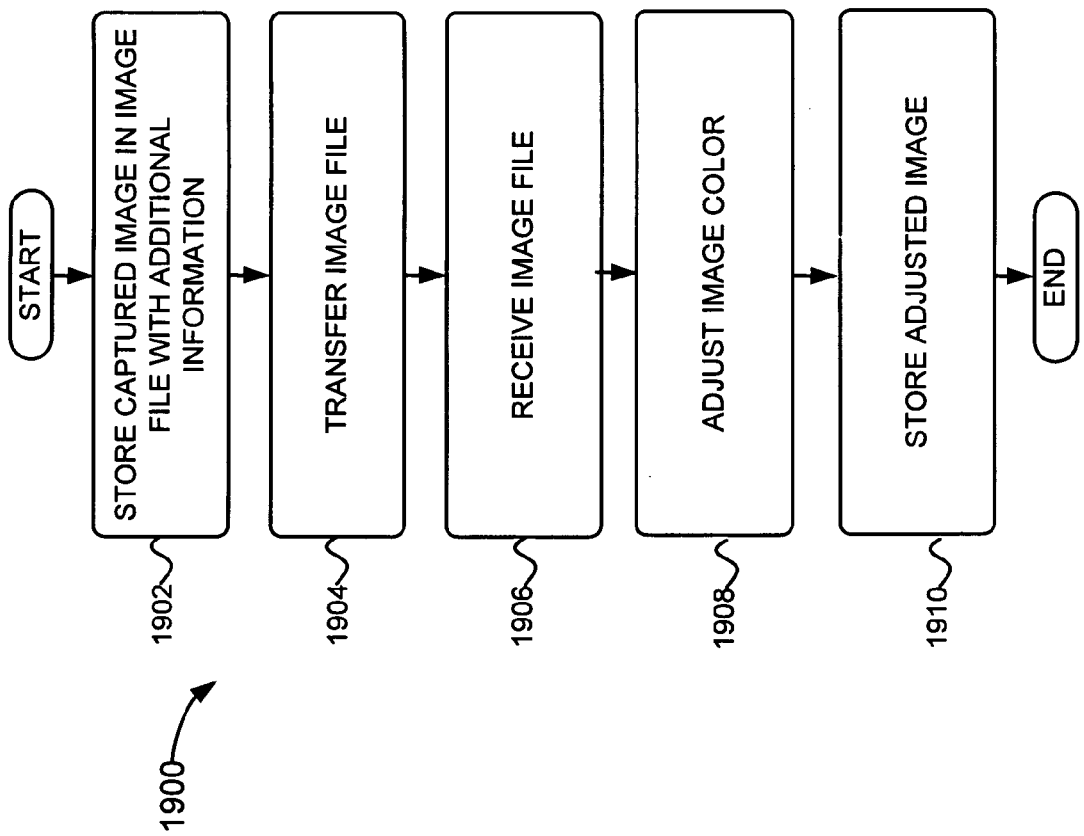

COLOR ADJUSTMENT FOR CAMERA

BACKGROUND

1. Related Field

Embodiments described herein relate generally to color adjustment for a camera.

2. Description of Related Art

Cameras are used for capturing images in different environments. Such environments include outdoors on a sunny day, outdoors on a cloudy day, indoors under incandescent (tungsten) light bulbs, and inside under florescent light bulbs. Each of these environments has a different light source: the sun, the sun filtered through clouds, and artificial lights, e.g., incandescent and florescent bulbs. Each of these light sources has a different color characteristic, e.g., a different "color spectrum" and/or a different "color temperature." The color temperature, for example, of light is the temperature (in Kelvin) at which a heated black-body radiator matches the hue of the light.

The "color temperature" of the environment can cause captured images to have an incorrect lighting "cast." A low color temperature shifts the lighting cast toward the red; a high color temperature shifts the lighting cast toward the blue. For example, artificial lights often may produce light of a low color temperature. Thus, images of indoor scenes illuminated by artificial light may obtain a yellow/orange cast, meaning that a white object would look yellow/orange. As another example, a clouded sun often may produce light of a high color temperature. Thus, images of scenes illuminated by a clouded sun may obtain a blue cast, meaning that a white object would look bluish.

If the camera, however, knows which object in the image is supposed to be white, the camera can calculate the difference between the measured color temperature of that object, e.g., yellow/orange, and the correct color temperature of a white object and shift all colors in the image by the same difference. This correction may be called "white balance." If the camera can do these calculations on its own, the correction may be called "automatic white balance."

SUMMARY

In one aspect, a device is provided. The device may include a camera to capture an image; a sensor to measure information indicative of a color characteristic of light in an environment; a processor to adjust a color characteristic of a flash based on the color characteristic of the light in the environment, and activate the flash for capturing the image according to the adjusted color characteristic; and storage to store the captured image.

In another aspect, the color characteristic of light in the environment may include a color temperature and the color characteristic of the flash may include a color temperature.

In another aspect, the processor may adjust the color characteristic of the flash to approach the color characteristic of the light in the environment.

In another aspect, the processor may match the color characteristic of the flash to the color characteristic of the light in the environment.

In another aspect, the flash may include a plurality of light-emitting diodes having a plurality of color characteristics.

In another aspect, the processor may adjust the color characteristic of the flash by adjusting an intensity of one or more of the plurality of light-emitting diodes.

In another aspect, the processor may adjust the color characteristic of the flash by adjusting the pulse width, frequency, or duty cycle of current passing through one or more of the plurality of light-emitting diodes during activation of the flash.

In another aspect, the flash may include a plurality of phosphorous-type light-emitting diodes having a plurality of color characteristics.

In another aspect, the processor may adjust the color characteristic of the flash by adjusting an intensity of one or more of the plurality of phosphorous-type light-emitting diodes.

In another aspect, the flash may include a plurality of xenon lamps having a plurality of color characteristics.

In another aspect, the processor may adjust the color characteristic of the flash by adjusting an intensity of one or more of the plurality of xenon lamps.

In another aspect, the flash may include a lamp and the processor may adjust the color characteristic of the flash by moving a filter in front of the lamp.

In another aspect, the device may include a communication interface for transferring the measured information and the adjusted color characteristic of the flash to a computer for image processing.

In another aspect, the device may include a mobile telephone.

In another aspect, a method is provided. The method may include: sensing information indicative of a color characteristic of light in an environment; automatically adjusting a color characteristic of a flash based on the color characteristic of the light in the environment; activating the flash for capturing an image according to the adjusted color characteristic; and capturing and storing the image.

In another aspect, the color characteristic of light in the environment may include a color temperature and the color characteristic of the flash may include a color temperature.

In another aspect, the method may automatically adjust the color characteristic of the flash may adjust the color characteristic of the flash to approach the color characteristic of the light in the environment.

In another aspect, the method may automatically adjust the color characteristic of the flash by matching the color characteristic of the flash to the color characteristic of the light in the environment.

In another aspect, the flash includes a plurality of light-emitting diodes having a plurality of color characteristics.

In another aspect, the method may automatically adjust the color characteristic of the flash by adjusting an intensity of one or more of the plurality of light-emitting diodes during activation of the flash.

In another aspect, the method may automatically adjust the color characteristic of the flash by adjusting the pulse width, frequency, or duty cycle of current passing through one or more of the plurality of light-emitting diodes.

In another aspect, wherein the flash may include a plurality of phosphorous-type light-emitting diodes having a plurality of color characteristics.

In another aspect, the method may automatically adjust the color characteristic of the flash may include adjusting an intensity of one or more of the plurality of phosphorous-type light-emitting diodes.

In another aspect, the flash may include a plurality of xenon lamps having a plurality of color characteristics.

In another aspect, the method may automatically adjust the color characteristic of the flash may include adjusting an intensity of one or more of the plurality of xenon lamps.

In another aspect, the flash may include a lamp and automatically adjusting the color characteristic of the flash may include moving a filter in front of the lamp.

In another aspect, a device is provided. The device may include: means for sensing information indicative of a color characteristic of light in an environment; means for adjusting a color characteristic of a flash based on the color characteristic of the light in the environment; means for activating the flash for capturing an image according to the adjusted color characteristic; and means for capturing and storing the image.

In another aspect, the color characteristic of light in the environment may include a color temperature and the color characteristic of the flash may include a color temperature.

In another aspect, the means for adjusting the color characteristic of the flash may include means for matching the color characteristic of the flash to the color characteristic of the light in the environment.

In another aspect, the means for adjusting the color characteristic of the flash may include means for adjusting the color characteristic of the flash to approach the color characteristic of the light in the environment.

In another aspect, the flash may include a plurality of light-emitting diodes having a plurality of color characteristics.

In another aspect, the means for adjusting the color characteristic of the flash may include means for adjusting an intensity of one or more of the plurality of light-emitting diodes.

In another aspect, the means for adjusting the color characteristic of the flash may include means for adjusting the pulse width, frequency, or duty cycle of current passing through one or more of the plurality of light-emitting diodes during activation of the flash.

In another aspect, the flash may include a plurality of phosphorous-type light-emitting diodes having a plurality of color characteristics.

In another aspect, the means for adjusting the color characteristic of the flash may include means for adjusting an intensity of one or more of the plurality of phosphorous-type light-emitting diodes.

In another aspect, the flash may include a plurality of xenon lamps having a plurality of color characteristics.

In another aspect, the means for adjusting the color characteristic of the flash may include means for adjusting an intensity of one or more of the plurality of xenon lamps.

In another aspect, the flash may include a lamp and adjusting the color characteristic of the flash comprises moving a filter in front of the lamp.

BRIEF DESCRIPTION OF THE DRAWINGS

The accompanying drawings, which are incorporated in and constitute a part of this specification, illustrate an embodiment of the invention and, together with the description, explain the invention. In the drawings, FIGS. 1A and 1B are diagrams of an exemplary device in which embodiments described herein may be implemented;

FIG. 2 is a diagram of exemplary components of device 100 of FIGS. 1A and 1B;

FIG. 3 is a block diagram of exemplary software components that may be implemented in device 100 of FIG. 1;

FIG. 4 is a flow chart of an exemplary process in one embodiment for color adjustment described herein;

FIG. 12 is a flow chart of an exemplary process in one embodiment for adjusting the color characteristic of flash 172 of FIG. 1;

FIG. 19 is a flow chart of an exemplary process for color adjustment for one embodiment described herein.

DETAILED DESCRIPTION

The following detailed description refers to the accompanying drawings. The same reference numbers in different drawings may identify the same or similar elements. Also, the following detailed description does not limit the scope of the claims. Rather, the claims define the scope of the inventions described herein.

There are environments where it is difficult to obtain a correct white balance (WB). For example, it is difficult to obtain a correct WB in "mixed-light conditions." An example of a mixed-light condition is, for example, when a camera flash is used indoors where artificial light is also present. The color temperature of the camera flash may be close to daylight, e.g., a color temperature of 5500 degrees Kelvin. If the camera's WB is adjusted for the color characteristic of the flash, the parts of the scene that are strongly illuminated by artificial light may have a yellow/red cast. If, on the other hand, the camera's WB is adjusted for the artificial light, then parts of the scene illuminated by the flash, e.g., the foreground, may have a blue cast.

Another example of a mixed-light condition is, for example, when the flash is used indoors where there is no artificial light, but some weak daylight. This situation may be the opposite of the first mixed-light condition described above. In this latter situation, if the camera's WB is adjusted for the flash, parts of the scene that are strongly illuminated by daylight may have a blue cast. If, on the other hand, the camera's WB is adjusted for the daylight, then parts of the scene illuminated with the flash, e.g., the foreground, may have a yellow/red cast.

In one embodiment described herein, some problems associated with a mixed-light condition may be avoided by measuring the color characteristic of the light in a scene's environment and adjusting the color characteristic of the camera's flash to match or approach the color characteristic of the scene's environment. In one embodiment, information indicative of the color temperature of the light in a scene's environment is measured and the color temperature of the camera's flash is adjusted to match or approach the color temperature of the scene's environment. In another embodiment, information indicative of the color spectrum of the light in a scene's environment is measured and the color spectrum of the camera's flash is adjusted to match or approach the color spectrum of in the scene's environment.

Adjusting the color characteristic of a flash may result in a more pleasant color rendition in various conditions, such as mixed-light conditions, and may result in better image quality when using the flash. Further, adjusting the color characteristics of the flash may result in longer camera battery life, as the flash may not have to illuminate foreground and background in order to reduce the effects of, for example, mixed-light conditions.

Exemplary Devices

Figure 1A:
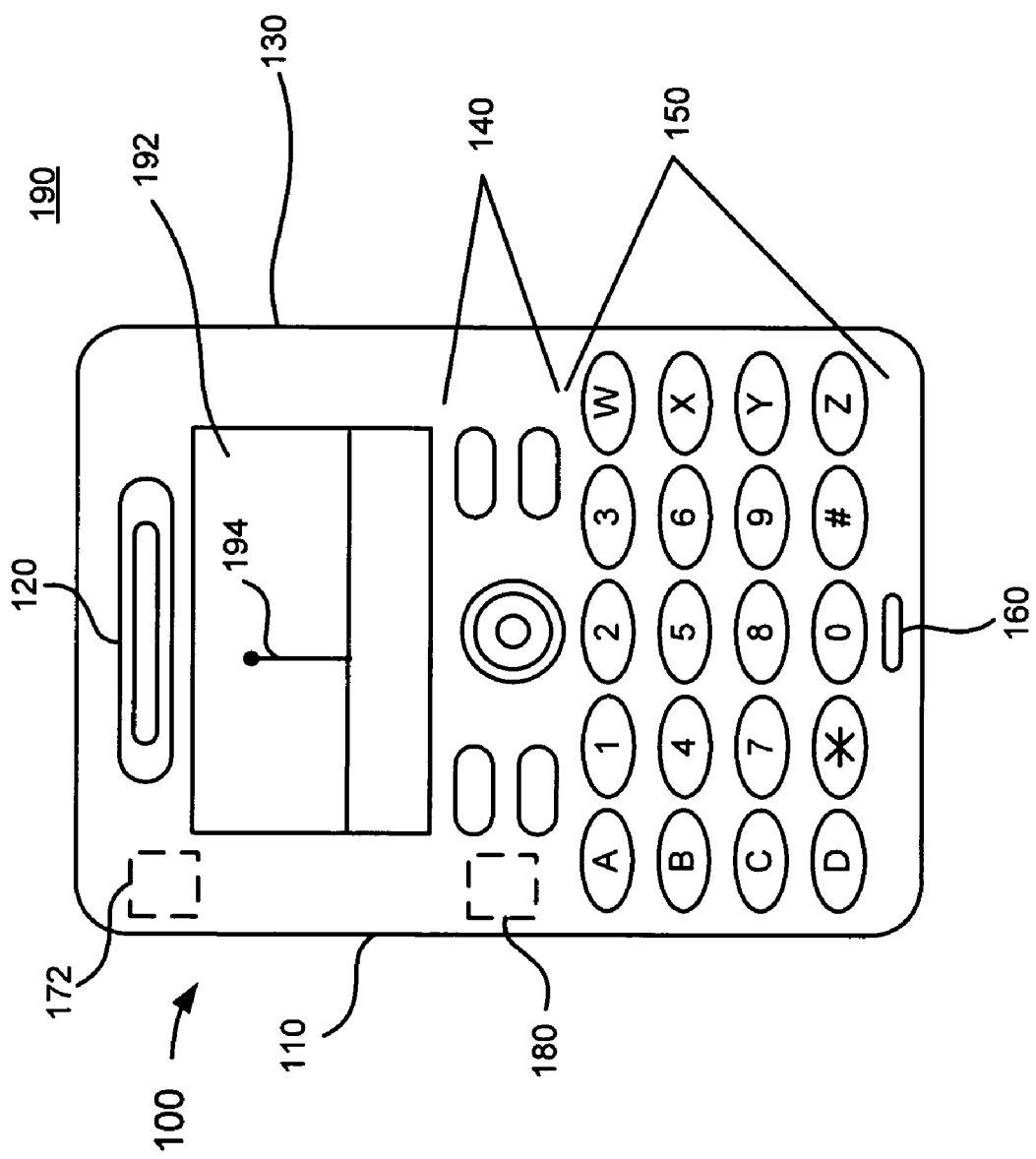

FIGS. 1A and 1B are diagrams of an exemplary device 100 in which embodiments described herein may be implemented. FIG. 1A is the front of device 100 and FIG. 1B is the back of device 100. As used herein, a "device" may include a radiotelephone; a personal communications system (PCS) terminal that may combine a cellular radiotelephone with data processing, facsimile, and/or data communications capabilities; a personal digital assistant (PDA) that may include a radiotelephone, pager, Internet/intranet access, web browser, organizer, calendar, a Doppler receiver, and/or global positioning system (GPS) receiver; a laptop; a GPS device; a computer; an MP3 player; a printer; a facsimile machine; a pager; a camera (e.g., film or digital camera); a video camera (e.g., a camcorder); binoculars; a telescope; and/or any other device capable of including or using a camera.

Device 100 may include housing 110, speaker 120, display 130, control keys 140, keypad 150, microphone 160, camera 170, flash 172, and light sensor 180. Flash 172 provides light for illuminating a scene for capturing an image. Flash 172 may be any type of light source and may include multiple light-emitting components. Flash 172 may include, for example, light-emitting diodes (LEDs) and/or one or more xenon bulbs. As used herein, a "flash" should be construed to include any illuminating light source for camera 170 and is not limited to a light source that illuminates only during capturing of an image. Light sensor 180 may measure the intensity and/or frequency of light in the environment of camera 170. Light sensor 180 may measure the color spectrum and/or color temperature of light in the environment of camera 170. Light sensor 180 may include one or more photodetectors, for example.

Housing 110 may protect the components of device 100 from outside elements. Housing 110 may be made from thermoplastics, metals, elastomers (e.g., synthetic rubber and/or natural rubber), and/or other similar materials. Speaker 120 may provide audible information to a user of device 100. Display 130 may provide visual information to the user. For example, display 130 may provide information regarding incoming or outgoing telephone calls, games, telephone numbers, the current time, e-mail, etc. Control keys 140 may permit the user to interact with device 100 to cause device 100 to perform one or more operations. Keypad 150 may include a standard telephone keypad and may include additional keys to enable inputting (e.g., typing) information into device 100. Microphone 160 may receive audible information from the user.

Camera 170 may include components that enable device 100 to capture and/or store video and/or images (e.g. pictures). Some components of camera 170 may be located on the front side of device 100 (not shown) and/or the rear side of device 100 (as shown in FIG. 1B). Flash 172 may be on the front side of device 100 (not shown) and/or the rear side of device 100 (as shown in FIG. 1B). Light sensor 180 may be on the front side of device 100 (not shown) and/or the rear side of device 100 (as shown in FIG. 1B). Light sensor 180 and/or flash 172 may form part of camera 170. Control keys 140 may include, for example, a shutter key, e.g., button, for the user to take a picture with camera 170. Display 130 may display captured or stored video and/or images. Camera 170 may be an electronic device that may capture and/or store images and/or video digitally or using photographic film.

As shown in FIGS. 1A and 1B, device 100 is in environment 190 and may display image 192 on display 130 of a scene including object 194. Environment 190 associated with image display 130 includes light, for example, that reflects off object 194 and is received by camera 170.

FIG. 2 is a diagram of exemplary components of device 100 of FIGS. 1A and 1B. As shown in FIG. 2, device 100 may include processing logic 210, memory 220, communication interface 240, antenna 250, user interface 260, camera 170, flash 172, and light sensor 180. In one embodiment, flash 172 and light sensor 180 may form part of camera 170. In another embodiment, flash 172 may be separate from camera 170 and may also be separate from device 100. Processing logic 210 may include a processor, microprocessor, an application specific integrated circuit (ASIC), or a field programmable gate array (FPGA). Processing logic 210 may include data structures or software programs to control operation of device 100 and its components. Memory 220 may include a hard disk drive (HDD), a random access memory (RAM), a read only memory (ROM), flash memory, a removable memory, and/or another type of memory to store data and/or instructions that may be used by processing logic 210, e.g., any type of a computer-readable medium. Camera 170 may store captured video and/or images, e.g., pictures, in memory 220. Display 130 may display stored video and/or images, e.g., pictures, from memory 220.

Communication interface 240 may include, for example, a universal serial bus (USB) port for communications over a cable. Communication interface 240 may include a transmitter that may convert baseband signals from processing logic 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna 250 for transmission and reception of the RF signals. Antenna 250 may include one or more antennas to transmit and receive RF signals over the air. Antenna 250 may receive RF signals from communication interface 240 and transmit them over the air and receive RF signals from over the air and provide them to communication interface 240. Communication interface 240 may incorporate the Bluetooth standard or a USB serial port standard.

User interface 260 may include mechanisms for inputting information into device 100 and/or for outputting information from device 100. Examples of input and output mechanisms may include speaker 120 to output audio signals, microphone 160 to receive audio signals, keys 140 or 150 to permit data and control commands to be input, and/or display 130 to output visual information. Display 130 may show content, such as pictures or videos. Speaker 120 may play content, such as music or radio programming. User interface 260 may also include a vibrator mechanism that causes device 100 to vibrate when, for example, an incoming telephone call is received. User interface 260 may allow the user to receive a menu of options. The menu may allow the user to select various functions or modes associated with applications executed by device 100. User interface 260 may allow the user to activate a particular mode or application, such as a mode defined by an application running in device 100.

FIG. 3 is a block diagram of exemplary software components that may be implemented in device 100 of FIG. 1. Referring to FIG. 3, memory 220 may include operating system 302, camera application program 304, and color adjustment application program 306. Operating system 302 provides a software platform on top of which application programs, such as camera application program 304 and color adjustment application program 306, can run. Camera application program 304 and color adjustment application program 306 are described in more detail below. Memory 220 may include other application programs not shown in FIG. 3.

Exemplary Processes

FIG. 4 is a flow chart of an exemplary process 400 in one embodiment for color adjustment described herein. Information indicative of a color characteristic of the light in a scene's environment, such as environment 190, may be measured (block 402). As used herein, "environment" shall be construed to include the volume of space from where camera 170 will receive light to capture an image of a scene. Further, measuring the color characteristic of light in environment 190 may be referred to as "measuring the color characteristic of environment 190." Referring to FIG. 1, for example, device 100 is in environment 190 and displays image 192 on display 130 of a scene including object 194. Environment 190 includes light that has a color characteristic, for example. In one embodiment, measuring the color characteristic of environment 190 may include measuring a "color temperature" of light in environment 190. In another embodiment, measuring the color characteristic of environment 190 may include measuring a color spectrum of light in environment 190. In one embodiment, the measurement of color characteristic of environment 190 may be made without the influence or expected influence of flash 172. A "color spectrum" may be a spectral power distribution, for example. In one embodiment, information indicative of the color spectrum of environment 190 may be measured by light sensor 180, for example.

Returning to FIG. 4, the white balance in camera 170 may be adjusted (block 404). For example, if the camera knows which object in the image is supposed to be white, the camera can calculate the difference between the measured color temperature of that object and the correct color temperature of a white object and shift all colors in the image by the same difference. The measured color characteristic and the color characteristic of flash 172 may be compared (block 406). In one embodiment, the color characteristic of flash 172 may be, for example, a color spectrum of flash 172. In another embodiment, the color characteristic of flash 172 may be, for example, the color temperature of flash 172. In one embodiment, the comparison includes generating the difference between the measured color spectrum and the color spectrum of flash 172. In another embodiment, the comparison includes generating the difference between the measured color temperature of environment 190 and the color temperature of flash 172. The color characteristic of flash 172 may be adjusted according to the comparison (block 408). In one embodiment, the color spectrum and/or color temperature of flash 172 is adjusted. In one embodiment the color characteristic of flash 172 is automatic, e.g., the user does not have to adjust the color characteristic him or herself.

The color characteristic of flash 172 may be adjusted to approach the measured color characteristic of environment 190. In one embodiment, the color temperature of flash 172 may be adjusted to approach the measured color temperature of environment 190. In another embodiment, the color spectrum of flash 172 may be adjusted to approach the measured color spectrum of environment 190. As used herein, "to approach" should be construed to include bringing the color characteristic of flash 172 closer to the color characteristic of environment 190 than the color characteristic of flash 172 would otherwise be without adjustment. As used herein, "to approach" should also be construed to include "to match," which should be construed to mean to bring the color characteristic of flash 172 to be approximately equal to the color characteristic of environment 190. Closeness and "approximately equal" may also be measured, for example, by the difference between the color temperatures. Closeness and "approximately equal" may be measured, for example, by the difference between the color spectrum, e.g., the difference between the spectral power plots.

Flash 172 may be activated according to the adjusted color characteristic and image 192 may be captured (block 410). Image 192 may be captured using camera 170 when, for example, the user presses a shutter key. Image 192 may be stored (block 410) in memory 220 as an image file.

Process 400 of FIG. 4 may be performed by camera application program 304 and color adjustment application program 306 running in memory 220 of device 100. Although process 400 in FIG. 4 shows blocks 402-408 in a particular order, process 400 is not limited to blocks 402-408 being in this particular order. For example, the white balance may be adjusted (block 404) after capturing image 192 (block 410). Further, the comparison in block 406 may take place at the same time or in the same process as the adjustment in block 408.

Figure 5:
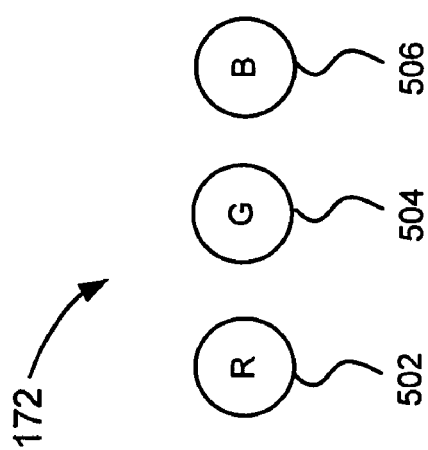
FIG. 5 is an exemplary diagram of components of flash 172 of FIG. 1.

FIG. 5 is an exemplary diagram of components of flash 172 of FIG. 1. In the embodiment of FIG. 5, flash 172 includes three LEDs: red LED 502, green LED 504, and blue LED 506. In another embodiment, flash 172 includes two LEDs or four or more LEDs. In other embodiments, flash 172 may include LEDs with colors other than red, green, or blue. The color characteristic, such as the color spectrum and/or color temperature, of flash 172 in FIG. 5 may be adjusted, for example, by altering the intensity of red LED 502, green LED 504, and/or blue LED 506. For example, the intensity of red LED 502 may be altered by changing the pulse width, frequency, and/or duty cycle of current passing through red LED 502. Likewise, the intensity of green LED 504 and blue LED 506 may be altered by changing the pulse width, frequency, and/or duty cycle of current passing through green LED 502 and blue LED 506, respectively.

In one embodiment, a fourth LED (not shown) is added to flash 172, wherein the fourth LED has a wavelength between red and green. In one embodiment, a fifth LED (not shown) is added to flash 172, wherein the fifth LED has a wavelength between green and red. Other LEDs having various other wavelengths may also be added in other embodiments.

Figure 6:
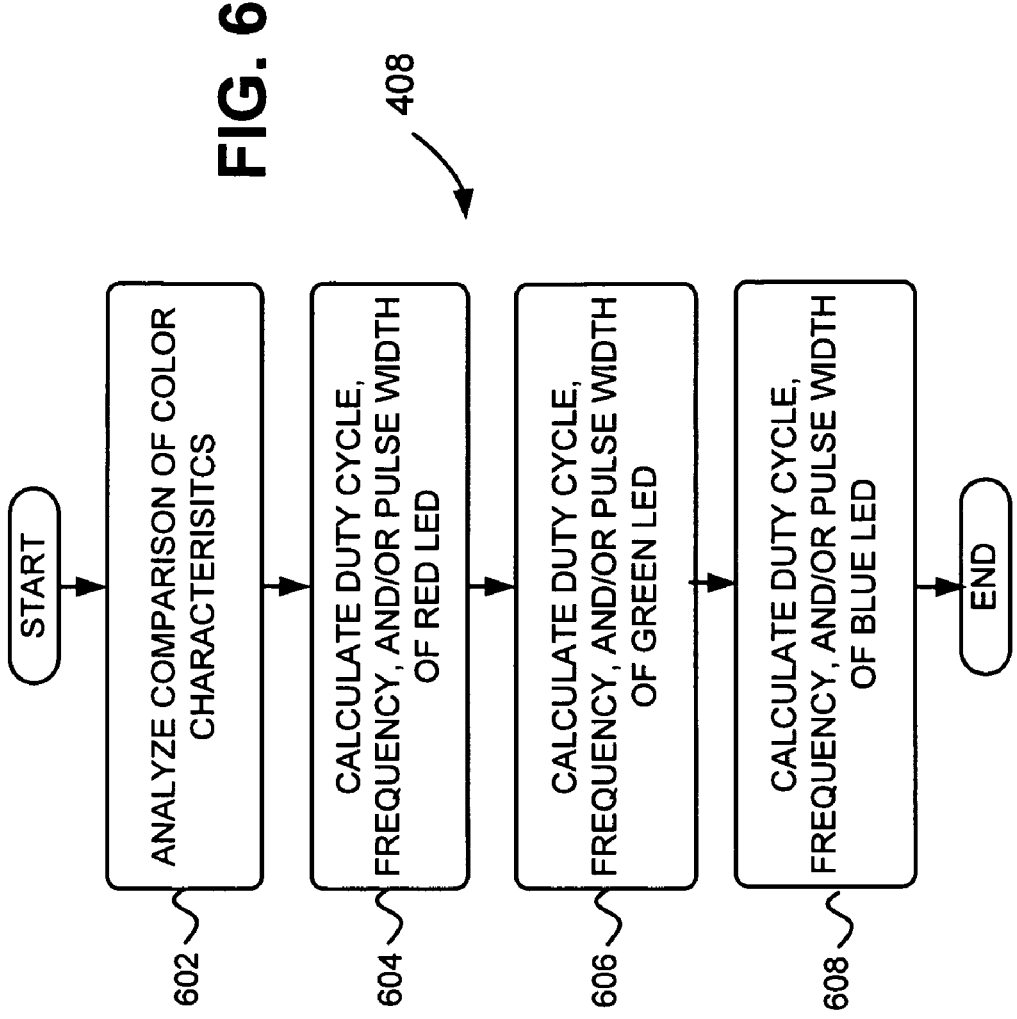
FIG. 6 is a flow chart of an exemplary process in one embodiment for adjusting the color characteristic of flash 172 of FIG. 1.

FIG. 6 is a flow chart of an exemplary process 408 in one embodiment for adjusting the color characteristic of flash 172 (block 408) in process 400. The comparison of the measured color characteristic and the color characteristic of flash 172 is analyzed (block 602). The frequency, pulse width, and/or duty cycle of electrical current for passing through red LED 502 is calculated (block 604). The frequency, pulse width, and/or duty cycle of electrical current for passing through green LED 504 is calculated (block 606). The frequency, pulse width, and/or duty cycle of electrical current passing through blue LED 506 is calculated (block 608). Accordingly, the color characteristic, such as color temperature, of flash 172 may be adjusted to approach the measured color characteristic, such as the color temperature, of environment 190. For example, if the measured color characteristic has a blue cast, the pulse width and/or duty cycle of blue LED 506 may be increased based on the measured characteristic. As another example, if the measured color characteristic has a red cast, the pulse width and/or duty cycle of red LED 502 may be increased based on the measured characteristic. Alternatively, the color spectrum of flash 172 may be adjusted to approach the measured color spectrum of environment 190. Flash 172 may be activated using the adjusted color characteristic and image 192 may be captured, such as in block 410 of FIG. 4.

Although process 600 in FIG. 6 shows blocks 602-608 in a particular order, process 600 is not limited to blocks 602-608 being in this particular order. For example, the analysis of the comparison in block 602 may take place at the same time or in the same process as the calculations of blocks 606 and 608.

Figure 7:
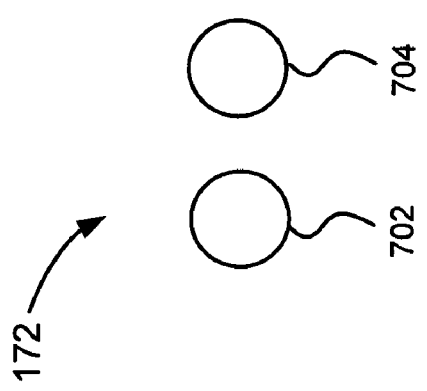
FIG. 7 is an exemplary diagram of components of flash 172 of FIG. 1.

FIG. 7 is an exemplary diagram of components of flash 172 of FIG. 1. In the embodiment of FIG. 7, flash 172 includes two phosphor-type LEDs: first phosphor-type LED 702 and second phosphor-type LED 704. A "phosphor-type LED" is an LED having a phosphor coating that uses florescence to adjust the LED's color characteristic. For example, a phosphor-type LED may adjust the color characteristic of the light that would otherwise be emitted from the LED to be more yellow. Different phosphor coatings may result in different adjustment of the color characteristic that would otherwise be emitted from the LED. In FIG. 7, for example, LED 702 may have a different phosphor coating than LED 704. As a result, the light emitted from LED 702 may have a different color characteristic than LED 704. In another embodiment, flash 172 includes three or more phosphor-type LEDs. The color characteristic, such as the color spectrum and/or color temperature, of flash 172 of FIG. 7 may be adjusted, for example, by altering the intensity of first LED 702 and/or second LED 704. For example, the intensity of first LED 702 and second LED 704 may be altered by changing the pulse width, frequency, and/or duty cycle of current passing through first LED 702 and second LED 704, respectively.

Figure 8:
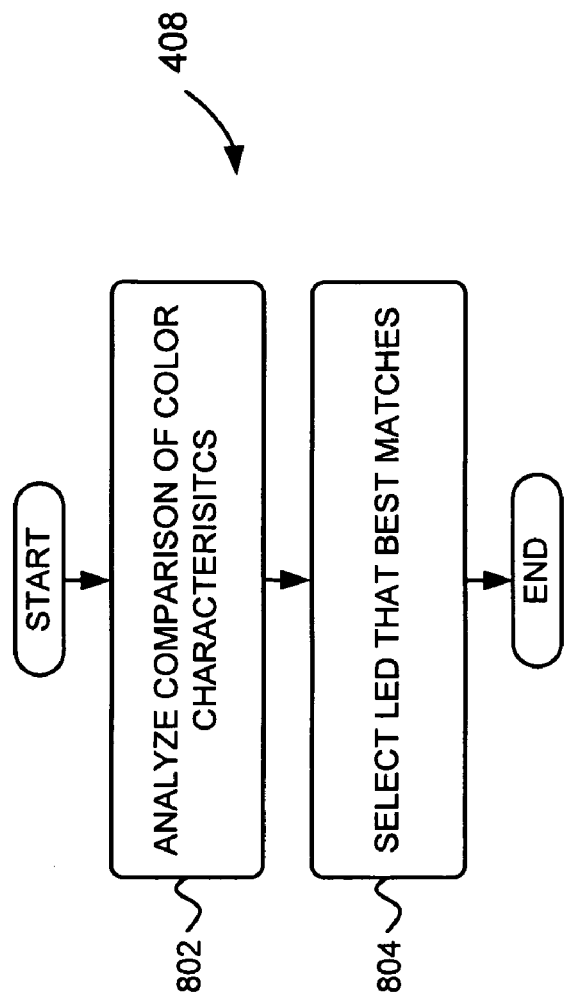
FIG. 8 is a flow chart of an exemplary process in one embodiment for adjusting the color characteristic of flash 172 of FIG. 1.

FIG. 8 is a flow chart of an exemplary process 408 in another embodiment for adjusting the color characteristic of flash 172 (block 408) in process 400. The comparison of the measured color characteristic and the color characteristic of flash 172 is analyzed (block 802). First LED 702 or second LED 704 may be selected (block 804). First LED 702 or second LED 704 may be selected based on which LED's color characteristic best matches the measured color characteristic. For example, LED 702 may be selected if the color temperature of LED 702 is closer to the measured color temperature of environment 190 than the color temperature of LED 704. That is, LED 702 may be used during activation of flash 702 and LED 704 may not be activated. Flash 172 of FIG. 7 may be activated using the adjusted color characteristic and image 192 may be captured, such as in block 410 of FIG. 4.

Although process 408 in FIG. 8 shows blocks 802-804 in a particular order, process 800 is not limited to blocks 802-804 being in this particular order. For example, the analysis of the comparison in block 802 may take place at the same time or in the same process as the selection in block 804.

Figure 9:
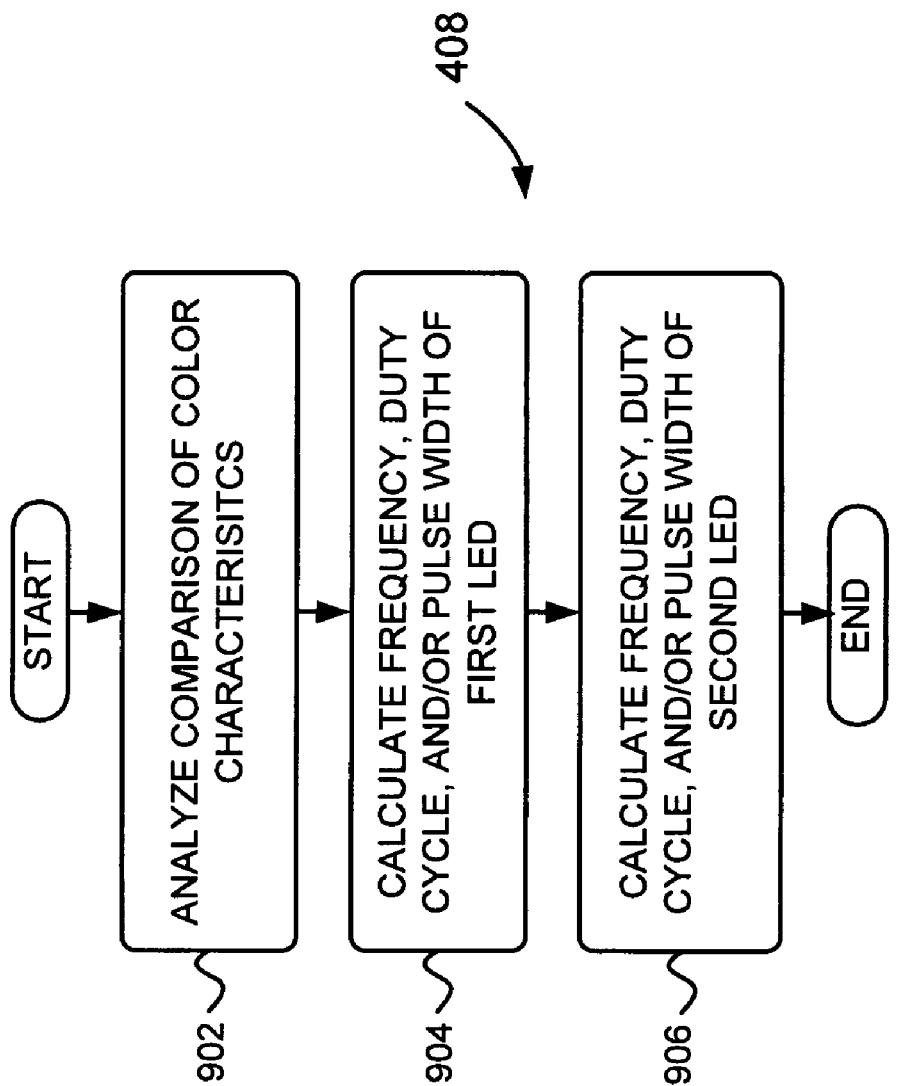
FIG. 9 is a flow chart of an exemplary process in one embodiment for adjusting the color characteristic of flash 172 of FIG. 1.

FIG. 9 is a flow chart of an exemplary process 408 in one embodiment for adjusting the color characteristic of flash 172 (block 408) in process 400 of FIG. 4. The comparison of the measured color characteristic and the color characteristic of flash 172 is analyzed (block 902). The frequency, pulse width, and/or duty cycle of electrical current for passing through first LED 702 is calculated (block 904). The frequency, pulse width, and/or duty cycle of electrical current for passing through second LED 704 is calculated (block 906). By adjusting the parameters associated with LED 702 and LED 704, the color characteristic, such as the color temperature, of flash 172 may be adjusted to approach the measured color characteristic, such as the measured color temperature, of environment 190. Alternatively, the color spectrum of flash 172 may be adjusted to approach the measured color spectrum of environment 190. Flash 172 of FIG. 7 may be activated using the adjusted color characteristic and image 192 may be captured, such as in block 410 of FIG. 4.

Note that the process shown in FIG. 8 may be considered a subset of the process shown in FIG. 9, wherein the duty cycle of current through first LED 702 or second LED 704 is considered to be zero (e.g., that LED will not be activated).

Although process 408 in FIG. 9 shows blocks 902-906 in a particular order, process 408 is not limited to blocks 902-906 being in this particular order. For example, the analysis of the comparison in block 902 may take place at the same time or in the same process as the calculations of blocks 904 and 906.

Figure 10:
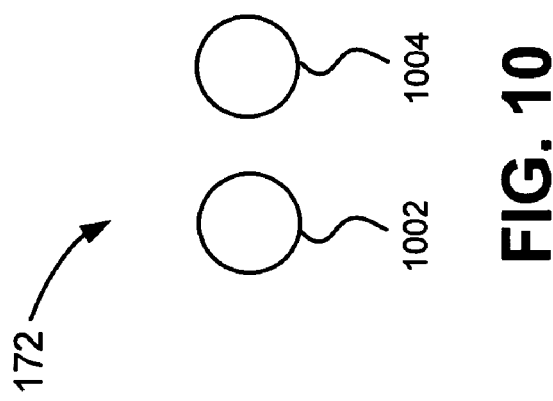
FIG. 10 is an exemplary diagram of components of flash 172 of FIG. 1.

FIG. 10 is an exemplary diagram of components of flash 172 of FIG. 1. In the embodiment of FIG. 10, flash 172 includes two xenon flash lamps: first xenon lamp 1002 and second xenon lamp 1004. A xenon flash lamp may produce extremely intense, incoherent, full-spectrum white light for very short durations. A xenon flash lamp may have a color temperature of 6,000 degrees Kelvin, for example. Alternatively, a xenon flash lamp may incorporate a tint to adjust the color temperature. For example, a xenon flash lamp may include a thin gold film or a filter to adjust the color temperature to 5,500 degrees Kelvin, e.g., the approximate color temperature of daylight. In FIG. 10, for example, xenon lamp 1002 may have a different tint than xenon lamp 1004. As a result, the light emitted from xenon lamp 1002 may have a different color characteristic than xenon lamp 1004. In another embodiment, flash 172 may include three or more xenon lamps. The color characteristic, such as the color spectrum and/or color temperature, of flash 172 of FIG. 10 may be adjusted, for example, by altering the duration of illumination of first xenon lamp 1002 and/or second xenon lamp 1004.

In one embodiment, flash 172 of FIG. 10 includes two complete flash "modules" to drive first xenon lamp 1002 and second xenon lamp 1004. In another embodiment, flash 172 of FIG. 10 includes one flash "module" to drive first xenon lamp 1002 and second xenon lamp 1004 and first xenon lamp 1002 and second xenon lamp 1004 are connected to the flash module in parallel. In one embodiment, one of the xenon lamps 1002 and 1004 has the color characteristics of a tungsten incandescent lamp. For example, flash 172 may activate the selected xenon lamp, e.g., xenon lamp 1102 or xenon lamp 1104.

Figure 11:
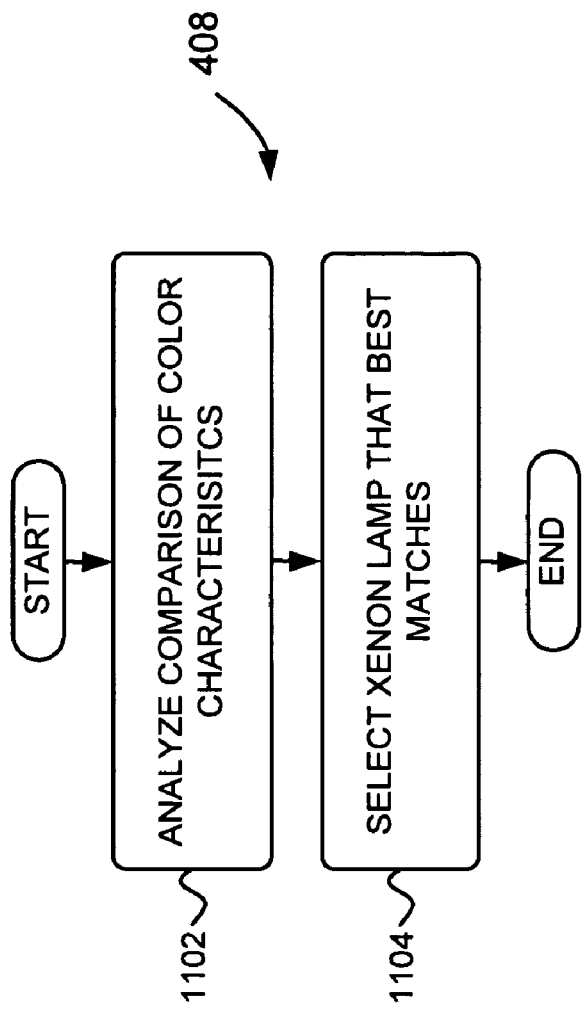
FIG. 11 is a flow chart of an exemplary process in one embodiment for adjusting the color characteristic of flash 172 of FIG. 1.

FIG. 11 is a flow chart of an exemplary process 408 in one embodiment for adjusting the color characteristic of flash 172 (block 408) in process 400. The comparison of the measured color characteristic and the color characteristic of flash 172 is analyzed (block 1102). First xenon lamp 1002 or second xenon lamp 1004 may be selected (block 1104). First xenon lamp 1002 or second xenon lamp 1004 may be selected based on which xenon lamp's color characteristic best matches the measured color characteristic of environment 190. For example, xenon lamp 1002 may be selected if the color temperature of xenon lamp 1002 is closer to the measured color temperature of environment 190 than the color temperature of second xenon lamp 1004. Flash 172 of FIG. 11 may be activated using the adjusted color characteristic and image 192 may be captured, such as in block 410 of FIG. 4.

Although process 408 in FIG. 11 shows blocks 1102-1104 in a particular order, process 408 is not limited to blocks 1102-1104 being in this particular order. For example, the analysis of the comparison in block 1102 may take place at the same time or in the same process as the selection in block 1104.

FIG. 12 is a flow chart of an exemplary process 408 in one embodiment for adjusting the color characteristic of flash 172 (block 408) in process 400 of FIG. 4. The comparison of the measured color characteristic and the color characteristic of flash 172 is analyzed (block 1202). The duration of illumination of first xenon lamp 1002 is calculated (block 1204). The duration of illumination of second xenon lamp 1004 is calculated (block 1206). The durations are based on achieving the desired color characteristic of flash 172. In some embodiments, the duration of xenon lamp 1002 may exceed the duration of illumination associated with lamp 1004, or vice versa, based on environment 190. Accordingly, the color characteristic, such as the color temperature, of flash 172 may be adjusted to approach the measured color characteristic, such as the temperature, of environment 190. Alternatively, the color spectrum of flash 172 may be adjusted to approach the measured color spectrum of environment 190. Flash 172 of FIG. 12 may be activated using the adjusted color characteristic and image 192 may be captured, such as in block 410 of FIG. 4. That is, the duration of illumination associated with each xenon lamp 1002 and xenon lamp 1004 is performed based on the calculations at blocks 1204 and 1206.

Note that the process shown in FIG. 11 may be considered a subset of the process shown in FIG. 12, wherein the duration of illumination of first xenon lamp 1002 or second xenon lamp 1004 is zero.

Although process 408 in FIG. 12 shows blocks 1202-1206 in a particular order, process 408 is not limited to blocks 1202-1206 being in this particular order. For example, the analysis of the comparison in block 1202 may take place at the same time or in the same process as the calculations of blocks 1204 and 1206.

Figure 13A:
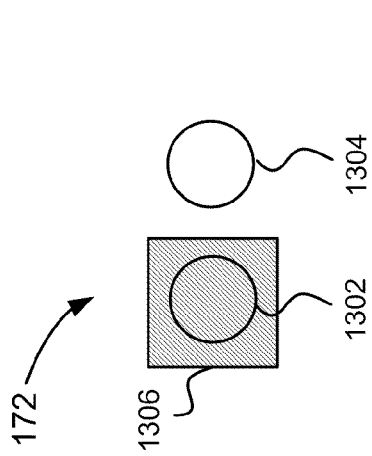
FIGS. 13A, 13B, and 13C are exemplary diagrams of components of flash 172 of FIG. 1.
Figure 13B:
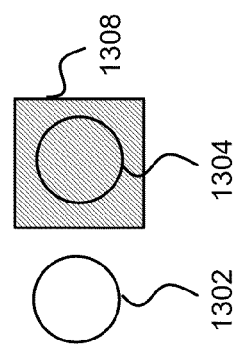
Figure 13C:
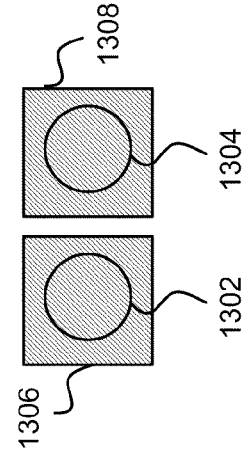

FIGS. 13A, 13B, and 13C are exemplary diagrams of components of flash 172 of FIG. 1. In the embodiment of FIGS. 13A, 13B, and 13C, flash 172 includes two light sources: first lamp 1302 and second lamp 1304. In one embodiment, first lamp 1302 and second lamp 1304 may be xenon lamps. In another embodiment, first lamp 1302 and second lamp 1304 may be phosphorous-type LEDs. In yet another embodiment, first lamp 1302 may be a xenon lamp and second lamp 1304 may be a phosphorous-type LED. In another embodiment, flash 172 of FIGS. 13A, 13B, and 13C may include three or more lamps. The color spectrum and/or color temperature of flash 172 of FIGS. 13A, 13B, and 13C may be adjusted, for example, by mechanically moving filters in front of first lamp 1302 and/or second lamp 1304. The mechanical movement may be automatic, e.g., the user does not have to move the filters him or herself. For example, in FIG. 13A, first lamp 1302 may lie behind filter 1306 and second lamp 1304 may not lie behind a filter. In FIG. 13B, first lamp 1302 may not lie behind a filter and second lamp 1304 may lie behind filter 1308. In FIG. 13C, first lamp 1302 may lie behind filter 1306 and second lamp 1304 may lie behind filter 1308. Filters 1306 and 1308 may alter the color characteristics of light emitted by lamp 1302 and/or lamp 1304, respectively. Accordingly, the color characteristic of flash 172 of FIGS. 13A, 13B, and 13C may be adjusted by moving filters 1306 and 1308.

In one embodiment, one of filters 1306 and 1308 has the color characteristics of daylight. In one embodiment, one of filters 1306 and 1308 has the color characteristics of a tungsten incandescent lamp.

Figure 14:
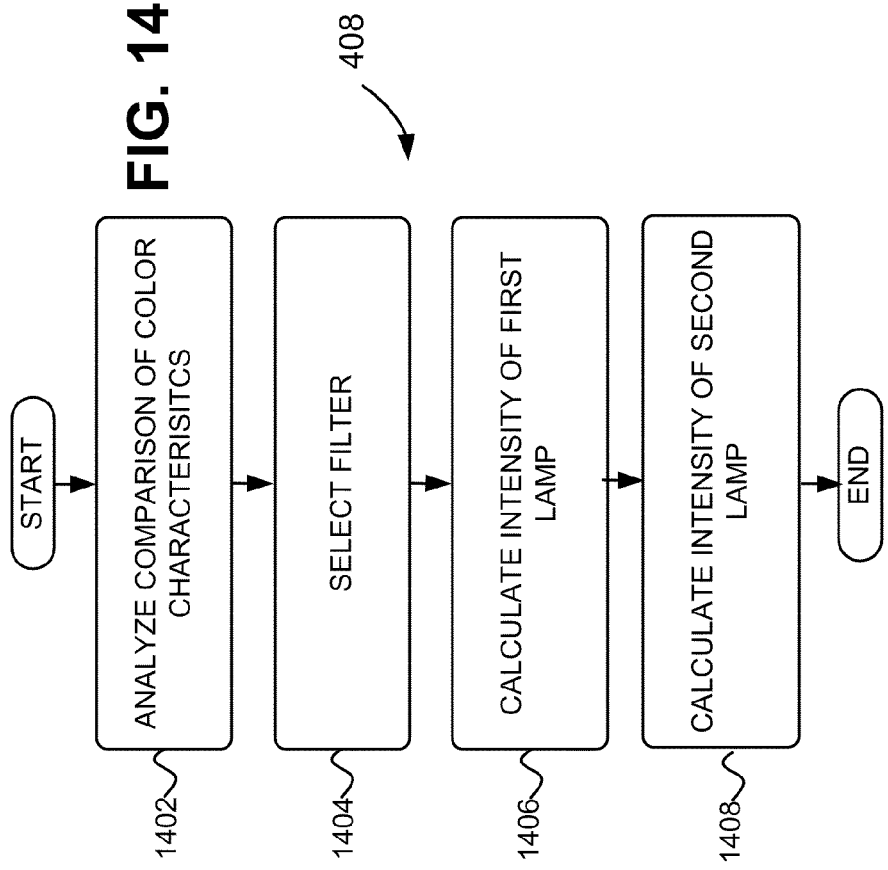
FIG. 14 is a flow chart of an exemplary process in one embodiment for adjusting the color characteristic of flash 172 in FIG. 1.

FIG. 14 is a flow chart of an exemplary process 408 in one embodiment for adjusting the color characteristic of flash 172 (block 408) in process 400 of FIG. 4. The comparison of the measured color characteristic and the color characteristic of flash 172 is analyzed (block 1402). One or more filters is/are selected (block 1404). The intensity and/or duration of illumination of first lamp 1302 is calculated (block 1406). The intensity and/or duration of illumination of second lamp 1304 is calculated (block 1408). The calculated intensity and/or duration are based on the characteristics of the particular filters and achieving the desired color characteristic of flash 172. Accordingly, the color temperature of flash 172 may be adjusted to approach the measured color temperature of environment 190. Alternatively, the color spectrum of flash 172 may be adjusted to approach the measured color spectrum of environment 190. Flash 172 of FIG. 14 may be activated using the adjusted color characteristic and image 192 may be captured, such as in block 410 of FIG. 4.

Note that the color characteristic of first lamp 1302 or second lamp 1304 may be adjusted by moving filter 1306 and/or 1308 partially over first lamp 1302 or second lamp 1304, respectively. In one embodiment, flash 172 includes only one lamp 1302 and the color characteristic of flash 172 is adjusted by moving filter 1306 partially or fully over lamp 1302.

Although process 408 in FIG. 14 shows blocks 1402-1406 in a particular order, process 408 is not limited to blocks 1402-1406 being in this particular order. For example, the analysis of the comparison in block 1402 may take place at the same time or in the same process as the calculations of blocks 1404 and 1406.

Figure 15:
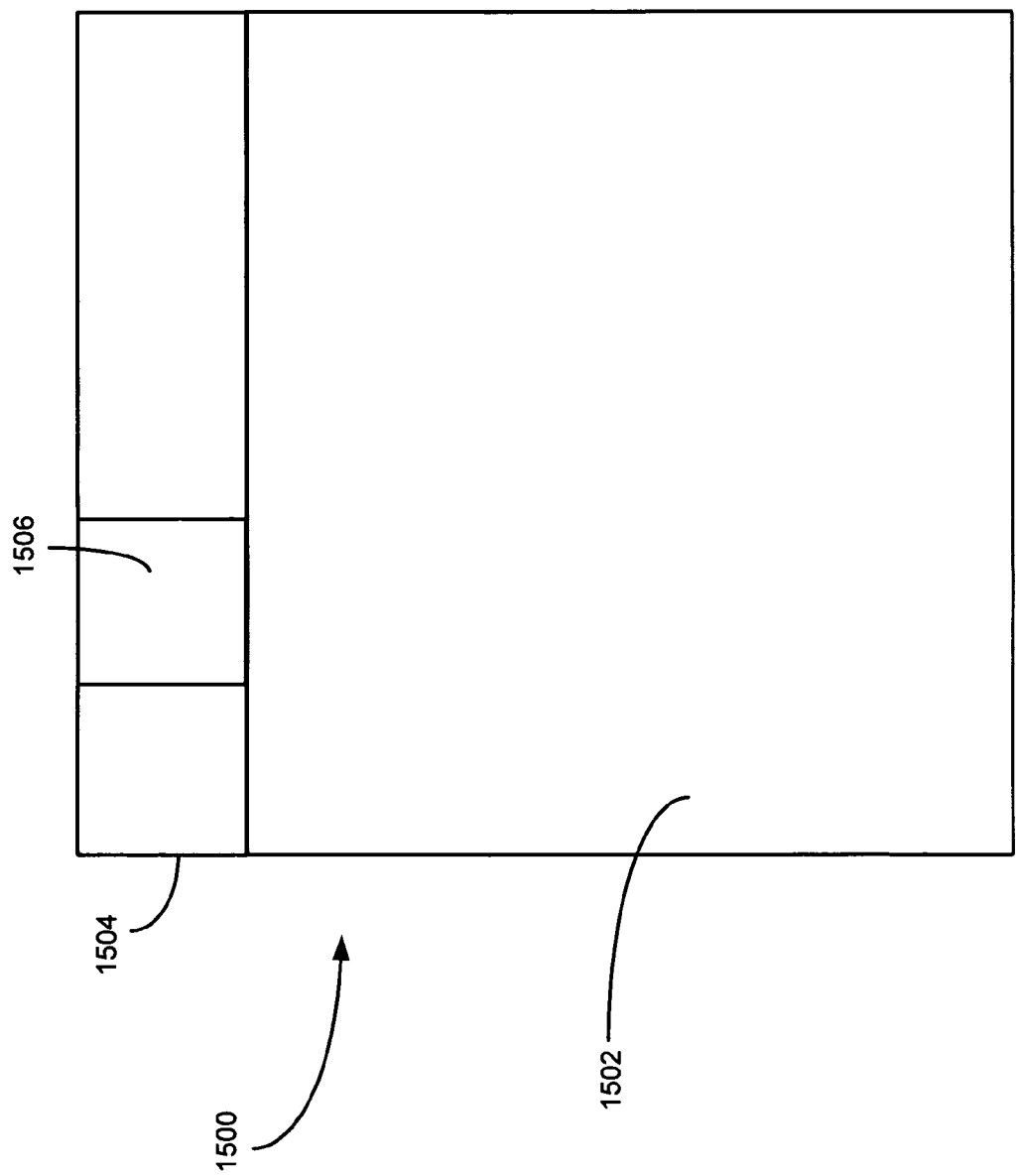
FIG. 15 is a block diagram of an exemplary image file consistent with embodiments described herein.

In process 400 of FIG. 4, the captured image 192 may be stored in memory 220, for example. In one embodiment, the captured image 192 is stored in memory 220 along with the measured color characteristic, the color characteristic of flash 172, and/or the adjusted color characteristic of flash 172. For example, FIG. 15 is a block diagram of an exemplary image file 1500 consistent with embodiments described herein. Image file 1500 may include image data 1502 that stores the captured image 192. Image file 1500 may include header 1504. Header 1504 may include field 1506 that stores the measured color characteristic, the color characteristic of flash 172, and/or the adjusted color characteristic of flash 172. Image file 1500 may be stored in memory 220. Image file 1500 may allow for later processing of image 192 based on the measured color characteristic, the color characteristic of flash 172, and/or the adjusted color characteristic of flash 172. In one embodiment, the user may select whether to store the measured color characteristic, the color characteristic of flash 172, and/or the adjusted color characteristic of flash 172 in memory 220.

Exemplary Post Processes

As mentioned above, image file 1500 may allow for later processing of image 192 based on color characteristic information, such as information in image file 1500. Later processing may take place on a computer, for example, coupled to memory 220 in device 100. Although a process may be characterized as a "post" process for a "later" time, the post-process may be performed at any time.

Figure 16:
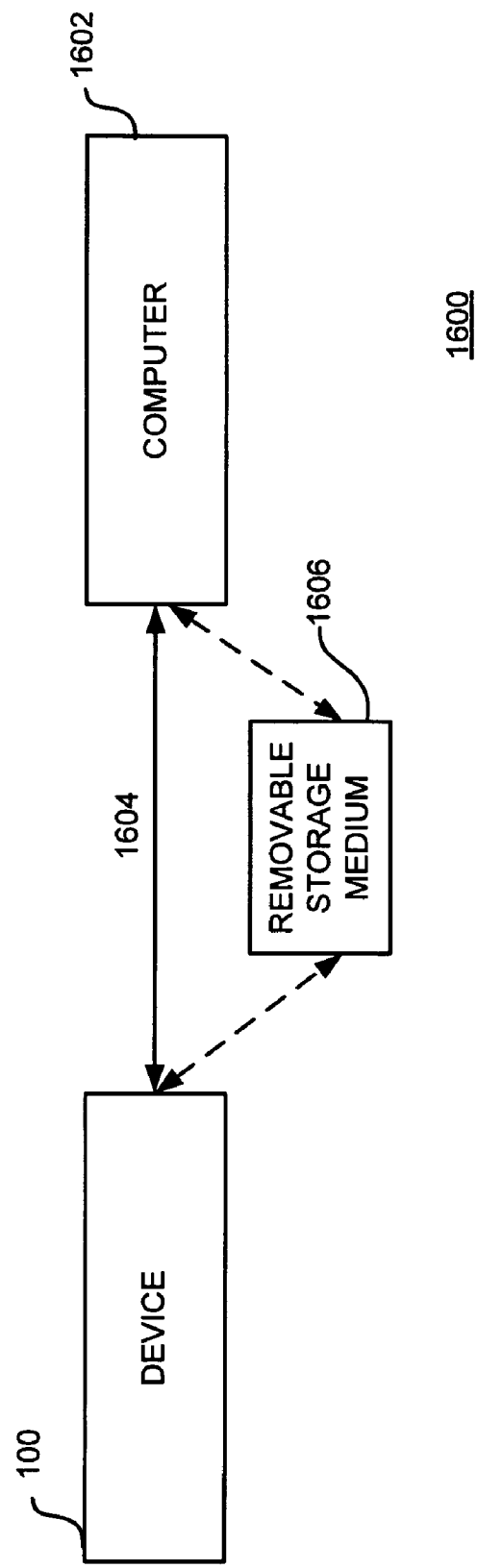
FIG. 16 is a block diagram of an exemplary configuration in which post processing embodiments described herein may be implemented.

FIG. 16 is a block diagram of an exemplary configuration 1600 in which "post processing" embodiments described herein may be implemented. Configuration 1600 may include device 100, computer 1602, removable storage medium 1606, and/or communication link 1604. Removable storage medium 1606 may form part of memory 220 of device 100, for example. As such, removable storage medium 1606 may store captured video and/or images, e.g., pictures, from camera 170. Removable storage medium 1606 may be transferred from device 100 to computer 1602. As a result of transferring removable storage medium 1606, captured video and/or images, e.g., pictures, from camera 170 may be transferred from device 100 to computer 1602. Alternatively, captured video and/or images, e.g., pictures, from camera 170 may be transferred from device 100 to computer 1602 via communication link 1604, such as a USB cable, for example, or a wireless link.

Figure 17:
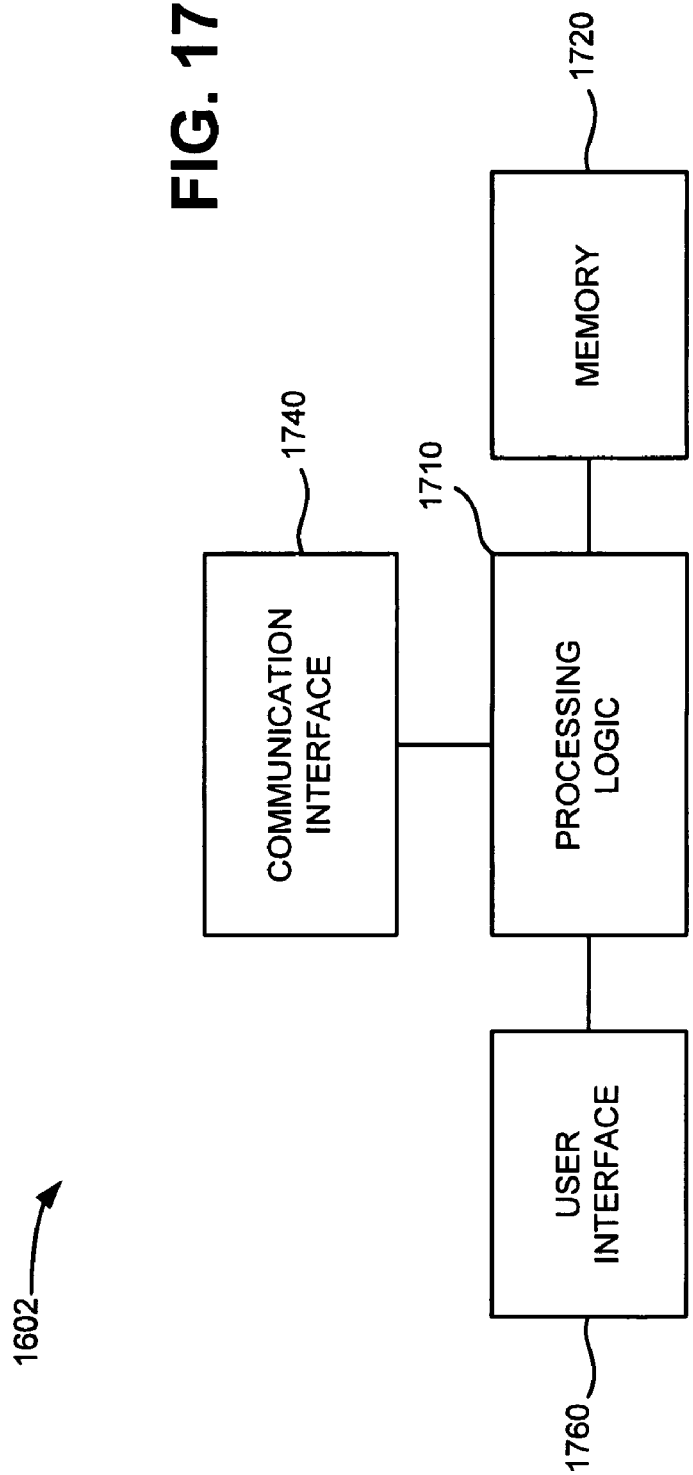
FIG. 17 is a diagram of exemplary components of computer 1602 in FIG. 16.

FIG. 17 is a diagram of exemplary components of computer 1602. As shown in FIG. 17, computer 1602 may include processing logic 1710, memory 1720, user interface 1760, and communication interface 1740. Processing logic 1710 may include a processor, microprocessor, an application specific integrated circuit (ASIC), field programmable gate array (FPGA), or the like. Processing logic 1710 may include data structures or software programs to control operation of computer 1602 and its components. Memory 1720 may include a hard disk drive (HDD), a random access memory (RAM), a read only memory (ROM), flash memory, a removable memory (such as storage medium 1606), and/or another type of memory to store data and/or instructions that may be used by processing logic 1710, e.g., any type of a computer-readable medium.

User interface 1760 may include mechanisms for inputting information to computer 1602 and/or for outputting information from computer 1602. Examples of input and output mechanisms may include a speaker to receive electrical signals and output audio signals, a microphone to receive audio signals and output electrical signals, a keyboard to permit data and control commands to be input, and/or a display to output visual information. The display may show content, such as images or video.

Communication interface 1740 may include, for example, a USB port for communications over a cable. Communication interface 1740 may also include a transmitter, receiver, and/or transceiver to perform functions of both a transmitter and a receiver. Communication interface 1740 may, for example, incorporate the Bluetooth standard or a USB serial port standard.

Figure 18:
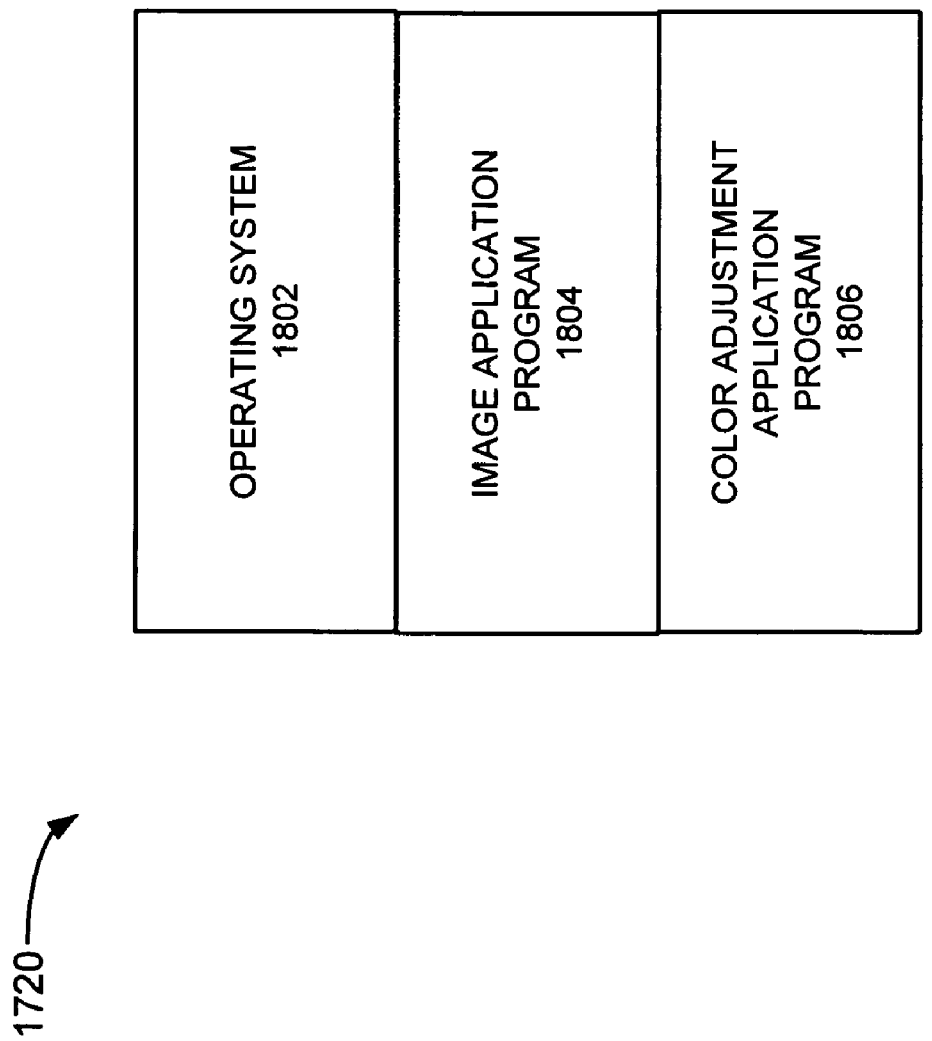
FIG. 18 is a block diagram of exemplary software components that may be implemented in computer 1602 of FIG. 16, such as in memory 1720.

FIG. 18 is a block diagram of exemplary software components that may be implemented in computer 1602 of FIG. 16, such as in memory 1720. Referring to FIG. 18, memory 1720 may include operating system 1802, image application program 1804, and color adjustment application program 1806. Operating system 1802 provides a software platform on top of which application programs, such as image application program 1804 and color adjustment application program 1806, can run. Memory 1720 may include other application programs not shown in FIG. 18.

FIG. 19 is a flow chart of an exemplary process 1900 for color adjustment for one embodiment described herein. Captured image 192 may be stored (block 1902) in, for example, memory 220 and/or removable storage medium 1606 as image file 1500. Image file 1500 may be transmitted to computer 1602 (block 1904). Computer 1602 may receive image file 1500 (block 1906). Image file 1500 may be transferred via communication link 1604, or removable storage medium 1606, for example. The color of image 192 may adjusted based on the measured color characteristic, the color characteristic of flash 172, and/or the adjusted color characteristic of flash 172 (block 1908). In one embodiment, computer 1602 may adjust the color characteristic of the image 192 based on the measured color characteristic, the color characteristic of flash 172, and/or the adjusted color characteristic of flash 172. The adjusted image may be stored in, for example, memory 1720 (block 1910).

Process 1900 (blocks 1902 through 1910, for example) of FIG. 19 may be performed by camera application program 304 and color adjustment application program 306 running in memory 220 of device 100. Process 1900 (blocks 1910 through 1910, for example) of FIG. 19 may be performed by image application program 1804 and color adjustment application program 1806 running in memory 1720 of computer 1602. Although process 1900 in FIG. 19 shows blocks 1902-1910 in a particular order, process 1900 is not limited to blocks 1902-1910 being in this particular order.

CONCLUSION

Accordingly, adjusting the color characteristic of a flash may result in a more pleasant color rendition in various conditions, such as mixed-light conditions for example. Accordingly, adjusting the color characteristic of a flash may result in better image quality when using the flash. Accordingly, adjusting the color characteristics of a flash may result in longer device battery life, as the flash may not have to illuminate foreground and background in order to reduce the effects of, for example, mixed-light conditions.

The foregoing description of embodiments provides illustration and description, but is not intended to be exhaustive or to limit the invention to the precise form disclosed. Modifications and variations are possible in light of the above teachings.

For example, while series of acts have been described with regard to some figures, the order of the acts may be modified in other implementations consistent with principles of the invention. Further, non-dependent acts may be performed in parallel.

Further, in one embodiment, flash 172 may include one or more xenon lamps, one or more LEDs, and/or one or more phosphorous-type LEDs. In such an embodiment, the color characteristic of flash 172 may be adjusted by adjusting the frequency, duty cycle, and/or pulse width of current passing through the LEDs and/or the phosphorous-type LEDs, for example, to achieve the desired color characteristic. In such an embodiment, the color characteristic of flash 172 may be adjusted by adjusting the duration of illumination of one or more of the light sources, such as the xenon lamp.

It should be emphasized that the term "comprises/comprising" when used in the this specification is taken to specify the presence of stated features, integers, steps or components but does not preclude the presence or addition of one or more other features, integers, steps, components or groups thereof.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
    a camera to capture an image;
    a sensor to measure information indicative of a color characteristic of light in an environment;
    a processor to adjust a color characteristic of a flash based on the color characteristic of the light in the environment, and activate the flash for capturing the image according to the adjusted color characteristic;
    storage to store the captured image, the information indicative of the color characteristic of the light in the environment, and a value indicative of the adjusted color characteristic of the flash; and
    a communication interface to transfer the stored captured image, the information indicative of the color characteristic of the light in the environment, and the value indicative of the adjusted color characteristic of the flash to an external computer.

2. The device of claim 1, where the color characteristic of light in the environment comprises a color temperature and the color characteristic of the flash comprises a color temperature.

3. The device of claim 1, where the processor adjusts the color characteristic of the flash to approach or match the color characteristic of the light in the environment.

4. The device of claim 3, where the processor matches the color characteristic of the flash to the color characteristic of the light in the environment.

5. The device of claim 1, where the flash comprises:
    one or more light-emitting diodes having a plurality of color characteristics,
    one or more xenon lamps having a plurality of color characteristics, or
    one or more phosphorous-type light-emitting diodes having a plurality of color characteristics.

6. The device of claim 5, where the processor adjusts the color characteristic of the flash by adjusting an intensity of light emitted from the one or more light-emitting diodes, the one or more phosphorous-type light-emitting diodes, or the one or more xenon lamps.

7. The device of claim 1, where the flash comprises a lamp and the processor adjusts the color characteristic of the flash by causing a filter to move in front of the lamp.

8. The device of claim 1, where the device comprises a mobile telephone.

9. A method implemented in an image capturing device, the method comprising:
    sensing, by the image capturing device, information indicative of a color characteristic of light in an environment;
    automatically adjusting, by the image capturing device, a color characteristic of a flash based on the color characteristic of the light in the environment;
    activating, by the image capturing device, the flash for capturing an image according to the adjusted color characteristic;
    capturing the image with the image capturing device;
    storing, in a memory of the image capturing device, the captured image, the information indicative of the color characteristic of the light in the environment, and a value indicative of the adjusted color characteristic of the flash; and
    transferring, by the image capturing device, the stored captured image, the information indicative of the color characteristic of the light in the environment, and the value indicative of the adjusted color characteristic of the flash to a computer.

10. The method of claim 9, where the color characteristic of light in the environment comprises a color temperature and the color characteristic of the flash comprises a color temperature.

11. The method of claim 9, further comprising:
    receiving, in the computer, the stored captured image, the information indicative of the color characteristic of the light in the environment, and the value indicative of the adjusted color characteristic of the flash to the computer; and
    adjusting color characteristics of the image based on the information indicative of the color characteristic of the light in the environment, and the value indicative of the adjusted color characteristic of the flash.

12. The method of claim 10, where automatically adjusting the color characteristic of the flash comprises adjusting the color characteristic of the flash to approach or match the color characteristic of the light in the environment.

13. The method of claim 12, where the flash comprises at least one of:
    a plurality of light-emitting diodes having a plurality of color characteristics,
    a plurality of phosphorous-type light-emitting diodes having a plurality of color characteristics, or
    a plurality of xenon lamps having a plurality of color characteristics.

14. The method of claim 12, where the flash comprises a lamp and automatically adjusting the color characteristic of the flash comprises moving a filter in front of the lamp.

15. The method of claim 13, where automatically adjusting the color characteristic of the flash comprises at least one of:
    adjusting an intensity of light emitted from the plurality of light-emitting diodes,
    adjusting an intensity of light emitted from the plurality of phosphorous-type light-emitting diodes, or
    adjusting an intensity of light emitted from the plurality of xenon lamps.

16. A device comprising:
    means for sensing information indicative of a color characteristic of light in an environment;
    means for adjusting a color characteristic of a flash based on the color characteristic of the light in the environment;
    means for activating the flash for capturing an image according to the adjusted color characteristic; and
    means for capturing and storing the image,
    where the flash comprises at least one lamp, having a light radiating surface, and the means for adjusting the color characteristic of the flash comprises:
        means for mechanically moving a filter, having a leading edge and a trailing edge, partially in front of the at least one lamp, so that either the leading edge or the trailing edge of the filter is positioned across the light radiating surface during operation of the at least one lamp.

17. The device of claim 16, where the color characteristic of light in the environment comprises a color temperature and the color characteristic of the flash comprises a color temperature.

18. The device of claim 17, where the means for adjusting the color characteristic of the flash comprises means for matching the color characteristic of the flash to the color characteristic of the light in the environment.

19. The device of claim 17, where the means for adjusting the color characteristic of the flash comprises means for adjusting the color characteristic of the flash to approach the color characteristic of the light in the environment.

* * * * *